US012729763B2

(12) United States Patent
Ono et al.

(10) Patent No.: US 12,729,763 B2
(45) Date of Patent: Sep. 8, 2026

(54) SHIFT DEVICE

(71) Applicant: KABUSHIKI KAISHA TOKAI-RIKA-DENKI-SEISAKUSHO, Aichi (JP)

(72) Inventors: Hiroki Ono, Niwa (JP); Yasuhiro Oka, Niwa (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 0 days.

(21) Appl. No.: 18/870,208

(22) PCT Filed: May 18, 2023

(86) PCT No.: PCT/JP2023/018630

§ 371 (c)(1),
(2) Date: Nov. 27, 2024

(87) PCT Pub. No.: WO2023/238628

PCT Pub. Date: Dec. 14, 2023

(65) Prior Publication Data

US 2025/0341251 A1 Nov. 6, 2025

(30) Foreign Application Priority Data

Jun. 10, 2022 (JP) ................................ 2022-094684

(51) Int. Cl.
*F16H 59/10* (2006.01)

(52) U.S. Cl.
CPC ................................ *F16H 59/105* (2013.01)

(58) Field of Classification Search
CPC .... F16H 59/105; F16H 59/12; F16H 59/0204; G05G 1/04; H01H 21/00
See application file for complete search history.

(56) References Cited

U.S. PATENT DOCUMENTS

2019/0145513 A1* 5/2019 Ono .................... F16H 59/0204
74/473.21

FOREIGN PATENT DOCUMENTS

| | | |
|---|---|---|
| JP | 2013-112251 A | 6/2013 |
| JP | 2018-043557 A | 3/2018 |
| JP | 2019-105937 A | 6/2019 |
| JP | 6662692 B2 | 3/2020 |
| JP | 2021-099763 A | 7/2021 |

OTHER PUBLICATIONS

International Search Report issued in PCT/JP2023/018630; mailed Jul. 25, 2023.

* cited by examiner

*Primary Examiner* — Ictor L Macarthur
(74) *Attorney, Agent, or Firm* — Studebaker Brackett PLLC

(57) ABSTRACT

A shift device includes an assembly body that is provided at a vehicle body side, a shift body that is assembled to the assembly body and that is moved to change a shift position, a moving portion that is assembled to the assembly body and that is moved when the shift body is moved, and a detection mechanism that is assembled to the assembly body and that detects a movement position of the shift body by detecting a relative position between the detection mechanism and the moving portion.

5 Claims, 7 Drawing Sheets

36
28
30
26
UP
FR
30
28
32
32A
34A
34B
34

SHIFT DEVICE

TECHNICAL FIELD

The present disclosure relates to a shift device in which movement of a shift body changes a shift position.

BACKGROUND ART

In a shift lever device described in JP 2021-99763 A, movement of a shift lever moves a first slider (including a first magnet) and a link (including a second magnet). Furthermore, detection of movement positions of the first slider and the link by a board (including a first Hall IC and a second Hall IC) detects the movement position of the shift lever.

In this shift lever device, the shift lever is assembled to a shift base, and the first slider, the link, and the board are assembled to a case.

SUMMARY OF INVENTION

Technical Problem

In consideration of the above circumstances, an object of the present disclosure is to obtain a shift device capable of achieving a high detection accuracy of a movement position of a shift body.

Solution to Problem

A shift device of a first aspect of the present disclosure includes: an assembly body provided at a vehicle body side; a shift body assembled to the assembly body, wherein movement of the shift body changes a shift position; a moving portion assembled to the assembly body, the moving portion moving when the shift body is moved; and a detection mechanism assembled to the assembly body, the detection mechanism detecting a movement position of the shift body by detecting a relative position between the detection mechanism and the moving portion.

As for a shift device of a second aspect of the present disclosure, in the shift device of the first aspect of the present disclosure, the shift body and the moving portion are separate bodies.

As for a shift device of a third aspect of the present disclosure, in the shift device of the first aspect or the second aspect of the present disclosure, the shift body, the moving portion, and the detection mechanism are assembled to the assembly body from the same direction.

As for a shift device of a fourth aspect of the present disclosure, in the shift device of any one of the first aspect to the third aspect of the present disclosure, the shift device further includes a biasing body assembled to the assembly body, the biasing body biasing the shift body toward a shift position side.

Advantageous Effects

In the shift device of the first aspect of the present disclosure, the assembly body is provided at the vehicle body side. Moreover, the movement of the shift body changes the shift position and moves the moving portion. Furthermore, the movement position of the shift body is detected by detecting the relative position between the moving portion and the detection mechanism.

The shift body, the moving portion, and the detection mechanism are assembled to the assembly body. This means that a high relative positioning accuracy can be achieved between the shift body, the moving portion, and the detection mechanism, which enables a high detection accuracy of the movement position of the shift body.

In the shift device of the second aspect of the present disclosure, the shift body and the moving portion are separate bodies. This means that an amount of movement of the shift body and an amount of movement of the moving portion can be adjusted.

In the shift device of the third aspect of the present disclosure, the shift body, the moving portion, and the detection mechanism are assembled to the assembly body from the same direction. This thereby enables the shift body, the moving portion, and the detection mechanism to be assembled to the assembly body easily.

In the shift device of the fourth aspect of the present disclosure, the biasing body biases the shift body toward the shift position side.

The biasing body is assembled to the assembly body. This means that a high relative positioning accuracy can be achieved between the shift body and the biasing body, which enables a high accuracy of the biased position of the shift body by the biasing body.

DESCRIPTION OF EMBODIMENTS

First Embodiment

Figure 1A:
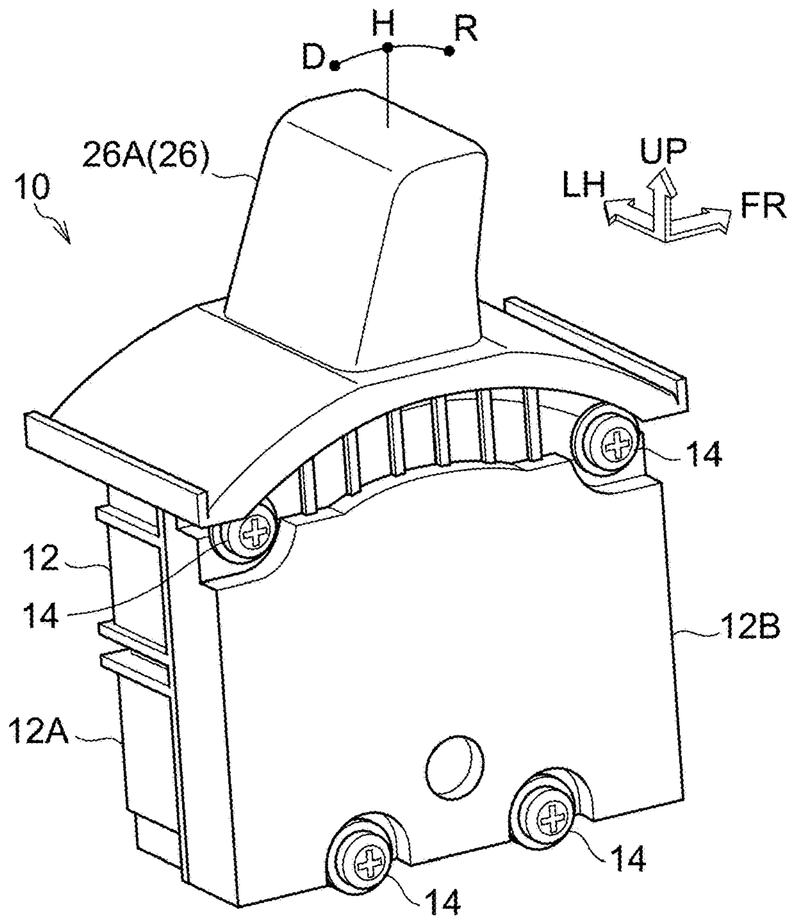
FIG. 1A is an overall perspective view illustrating a shift device according to a first embodiment of the present disclosure, as viewed obliquely from the right and the rear.

FIG. 1A is an overall perspective view illustrating a shift device 10 according to a first embodiment of the present disclosure, as viewed obliquely from the right and the rear. Note that in the drawings arrow FR indicates forward of the shift device 10, arrow LH indicates leftward of the shift device 10, and arrow UP indicates upward of the shift device 10.

The shift device 10 according to the present embodiment is attached to a console (omitted in the drawings) serving as a vehicle body side of a vehicle (automobile), with forward, leftward, and upward of the shift device 10 respectively oriented in the forward, leftward, and upward directions of the vehicle.

As illustrated in FIG. 1A, the shift device 10 has a plate 12, which serves as an installation body and is made from resin with a substantially cuboidal box shape, and the shift device 10 is installed in the vehicle by attaching the plate 12 to an inside of the console. An upper wall of the plate 12 is exposed to a vehicle cabin interior through the console.

A main plate 12A, which serves as an assembly body and is substantially cuboidal box-shaped, is provided at a left side portion of the plate 12, and an inside of the main plate 12A is open toward the right side. A sub plate 12B, which serves as a covering body and is substantially cuboidal box-shaped, is provided at a right side portion of the plate 12, and an inside of the sub plate 12B is open toward the left side. The plate 12 is configured with the main plate 12A and the sub plate 12B assembled together in the left-right direction, with a front end portion, a rear end portion, and a lower end portion of the sub plate 12B respectively fastened to a front wall, a rear wall, and a lower wall of the main plate 12A using assembly screws 14.

Figure 2A:
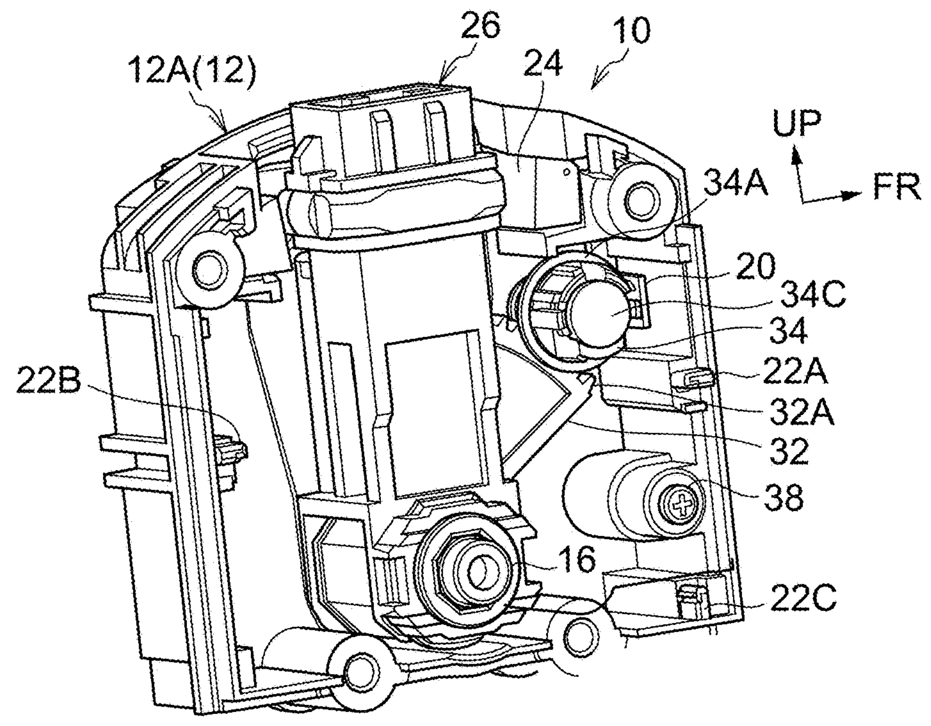
FIG. 2A is a perspective view illustrating an inside of a main plate of the shift device according to the first embodiment of the present disclosure, as viewed obliquely from the right and the rear.
Figure 2B:
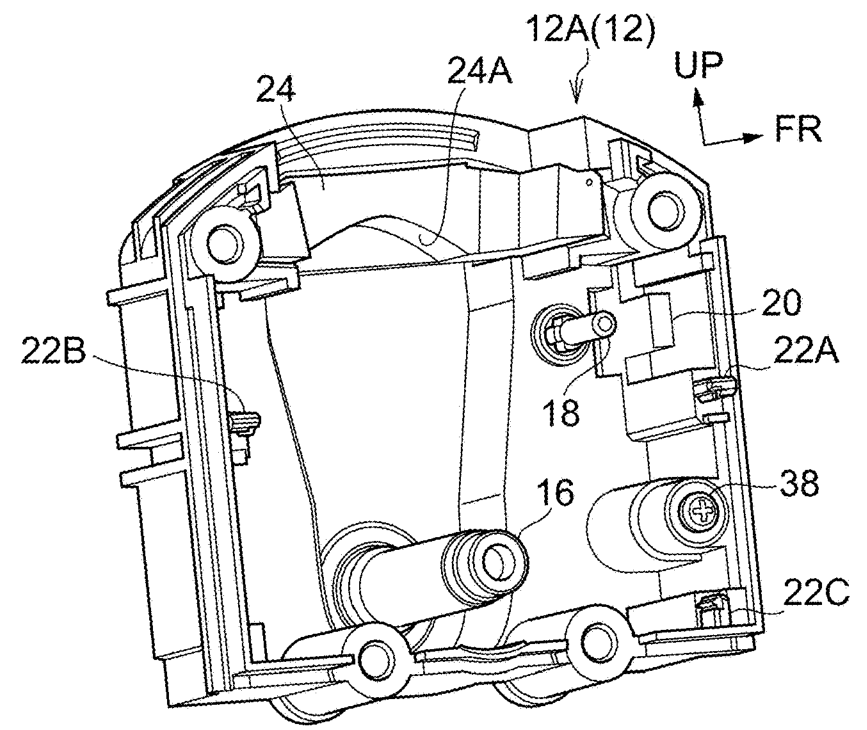
FIG. 2B is a perspective view illustrating the main plate of the shift device according to the first embodiment of the present disclosure, as viewed obliquely from the right and the rear.

A support shaft 16, which serves as a support portion and is substantially circular pillar-shaped, is integrally provided at a left face inside the main plate 12A (see FIG. 2A and FIG. 2B) at a lower side and front-rear direction central portion, and the support shaft 16 protrudes toward the right. An assembly shaft 18, which serves as an assembly portion and is substantially circular pillar-shaped, is integrally provided at the left face inside the main plate 12A at a front side and up-down direction intermediate portion, and the assembly shaft 18 protrudes toward the right. An assembly claw 20, which serves as a latch portion and is substantially rectangular plate-shaped, is integrally provided at the left face inside the main plate 12A at a front side of the assembly shaft 18, and the assembly claw 20 protrudes toward the right and is placed perpendicular to the front-rear direction. A leading end portion of the assembly claw 20 is configured with a right-angled triangular shaped cross-section protruding at the rear side thereof, with the left face of the leading end portion of the assembly claw 20 perpendicular to the left-right direction.

A front restriction pillar 22A, which serves as a restricting portion and is substantially rectangular pillar-shaped, is integrally provided at the front wall of the main plate 12A at an up-down direction intermediate portion, and the front restriction pillar 22A protrudes toward the right and extends in the front-rear direction. A rear restriction pillar 22B, which serves as the restricting portion and is substantially rectangular pillar-shaped, is integrally provided at the rear wall of the main plate 12A at an up-down direction intermediate portion, and the rear restriction pillar 22B protrudes toward the right and extends in the front-rear direction. A lower restriction pillar 22C, which serves as the restricting portion and is substantially rectangular pillar-shaped, is integrally provided at the lower wall of the main plate 12A at a front portion, and the lower restriction pillar 22C protrudes toward the right and extends in the up-down direction.

A restraint block 24, which serves as a biasing body configuring a biasing mechanism and is block-shaped, is fixed to an upper portion inside the left wall of the main plate 12A, and a restraint face 24A serving as a biasing face is formed on a lower face of the restraint block 24. The restraint face 24A is configured with a substantially inverted V-shaped cross-section, an interior of the restraint face 24A is open toward the lower side and the right side, and the restraint face 24A inclined in a direction toward the upper side on progression toward the front-rear direction center from a front end and a rear end thereof.

A lever 26 (see FIG. 2A), which serves as a shift body and is substantially rectangular pillar-shaped, is assembled to the inside of the main plate 12A. The support shaft 16 of the main plate 12A pierces through and fits together with a lower end portion of the lever 26, and the lever 26 is able to swing (move) in the front-rear direction centered on the support shaft 16. The lever 26 passes through an upper wall of the main plate 12A so as to be able to swing, and a knob 26A, which serves as an operation portion and is substantially cuboidal-shaped, is provided at an upper portion of the lever 26. The lever 26 is capable of being swing-operated at the knob 26A by an occupant of the vehicle, or particularly a driver, with the lever 26 being swung thereby, and a shift position of the lever 26 changed to, from front to rear, an R position (reverse position), an H position (home position), or a D position (drive position).

Figure 6:
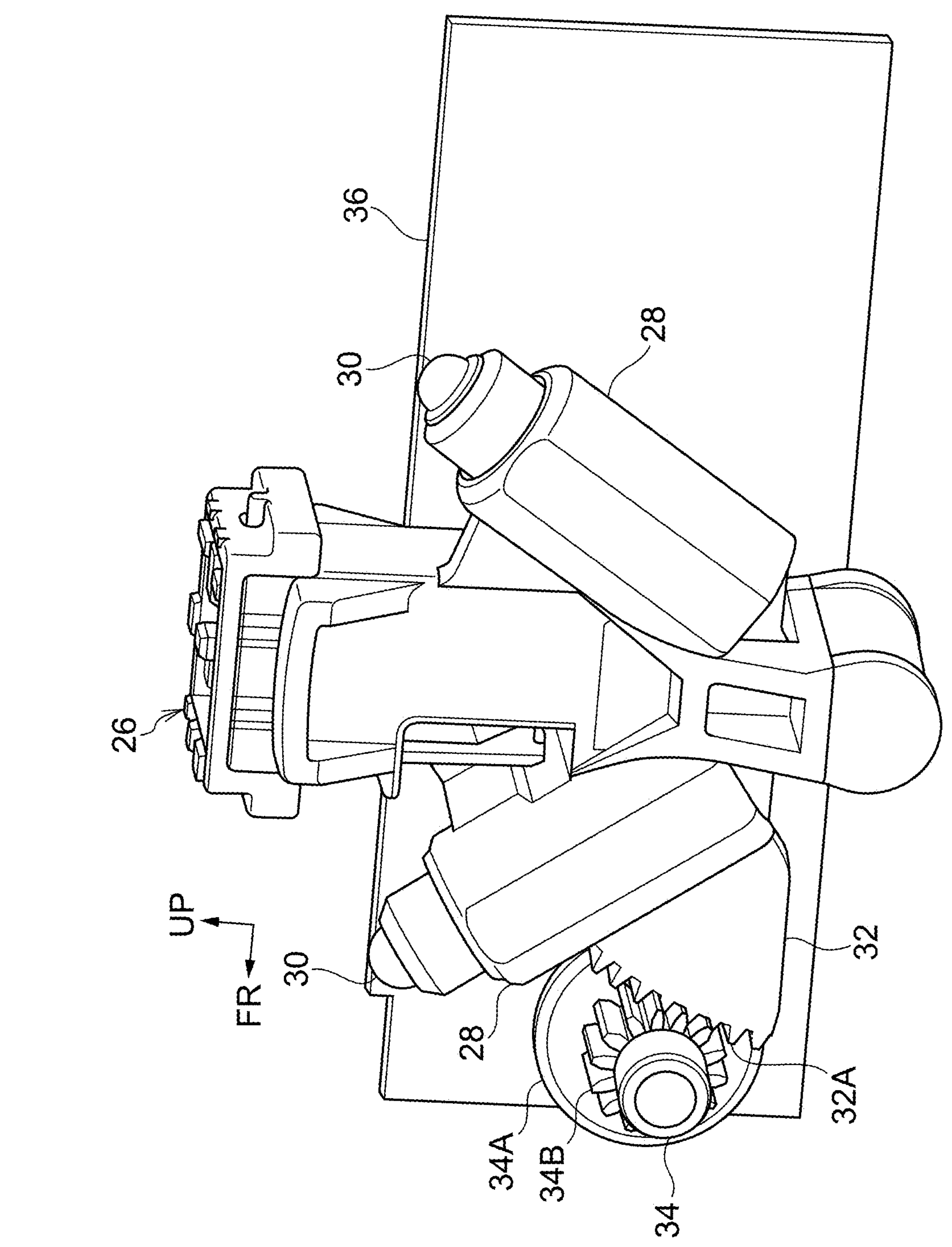
FIG. 6 is a perspective view illustrating a lever, a magnet body, and a circuit board of the shift device according to the second embodiment of the present disclosure, as viewed obliquely from the left and the rear.

A restraint cylinder 28 (see FIG. 6), which serves as a guide member configuring the biasing mechanism and is substantially bottomed circular cylinder-shaped, is integrally provided at the left side of a lower portion of the lever 26, and an axial direction of the restraint cylinder 28 is aligned with the up-down direction and the interior thereof is open upward. A restraint pin 30 (see FIG. 6), which serves as a biasing member configuring the biasing mechanism and is substantially circular pillar-shaped, is inserted coaxially inside the restraint cylinder 28 and fitted together therewith, and the restraint pin 30 is able to move in the up-down direction guided by the restraint cylinder 28 and also has a leading end face (upper end face) protruding in a substantially hemi-spherical surface shape therefrom. A spring (omitted in the drawings) serving as a biasing portion configuring the biasing mechanism is inserted inside the restraint cylinder 28, and the spring is configured by a compression coil spring. The spring is spanned between a bottom wall (lower wall) of the restraint cylinder 28 and a base end face (lower end face) of the restraint pin 30 and biases the restraint pin 30 toward the leading end side, and the leading end face of the restraint pin 30 is abutted against a front-rear direction center of the restraint face 24A of the restraint block 24 by biasing force of the spring. This means that the lever 26 is biased toward the H position side and held in the H position, and when action of swing-operation force on the lever 26 has been released in a state in which the lever 26 had been swing-operated to a position other than the H position against the biasing force of the spring, the lever 26 is swung (returned) to the H position by biasing force of the spring.

A gear plate 32, which serves as a coupling portion and is substantially fan profile plate-shaped, is integrally provided at a lower portion of the lever 26, and the gear plate 32 protrudes toward the front side. Gear teeth 32A (see FIG. 6) are formed to an upper side portion of the gear plate 32, with the gear teeth 32A configuring a gear centered on a swing center of the main plate 12A.

A magnet body 34 (see FIG. 2A), which serves as a moving portion and is substantially circular pillar-shaped, is assembled to the inside of the main plate 12A. The assembly shaft 18 of the main plate 12A is inserted coaxially into the magnet body 34 and fitted together therewith, with the magnet body 34 able to rotate (move) centered on the assembly shaft 18.

A latch plate 34A, which is circular ring plate-shaped, is integrally provided at a left-right direction intermediate portion of an outer periphery of the magnet body 34, and the latch plate 34A protrudes coaxially at a radial direction outside of the magnet body 34. When the assembly shaft 18 is being inserted into the magnet body 34, the latch plate 34A abuts against a leading end portion of the assembly claw 20 of the main plate 12A, the assembly claw 20 is elastically deformed toward the front side, the latch plate 34A passes the leading end portion of the assembly claw 20, and then the assembly claw 20 is elastically restored to the rear side. This means that the left face of the leading end portion of the assembly claw 20 latches movement of the latch plate 34A toward the right and the left face inside the main plate 12A latches movement of the magnet body 34 toward the left, latching movement of the magnet body 34 in the left-right directions.

A rotation gear 34B (see FIG. 6) serving as a coupled-to portion is coaxially formed at a left portion of the magnet body 34, with the gear teeth 32A of the lever 26 (the gear plate 32) meshed with the rotation gear 34B. This means that by the lever 26 being swung, and the gear plate 32 swinging as one body with the lever 26, the rotation gear 34B is rotated by the gear teeth 32A, and the magnet body 34 is rotated. A magnet 34C, which serves as a detected portion and is circular plate-shaped, is coaxially fixed inside a right portion of the magnet body 34, and due to the magnet body 34 being rotated, the magnet 34C is rotated as a single body with the magnet body 34, and a direction of a magnetic field generated by the magnet 34C is changed.

Figure 1B:
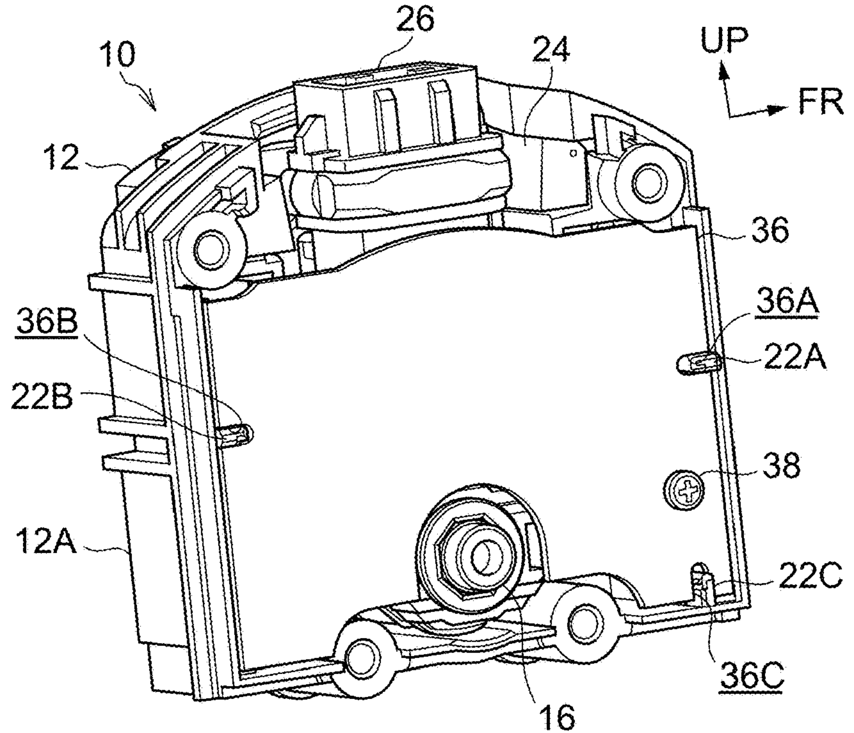
FIG. 1B is a perspective view illustrating an interior of the shift device according to the first embodiment of the present disclosure, as viewed obliquely from the right and the rear.
Figure 2C:
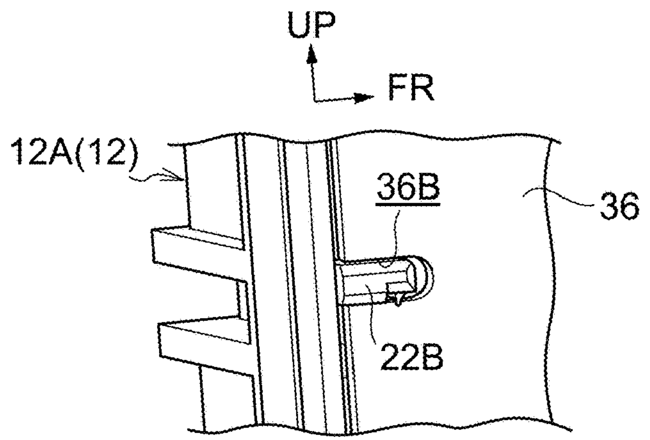
FIG. 2C is a perspective view illustrating a positioning state of a circuit board of the shift device according to the first embodiment of the present disclosure, as viewed obliquely from the right and the rear.

A circuit board 36 (see FIG. 1B and FIG. 2C), which serves as a detection mechanism and is substantially rectangular plate-shaped, is assembled at a right side of the main plate 12A, and the circuit board 36 is placed perpendicular to the left-right direction. A front restriction hole 36A, which serves as a restricted portion and is substantially rectangular-shaped, is formed piercing through an up-down direction intermediate portion of a front end portion of the circuit board 36, and the front restriction hole 36A extends in the front-rear direction and is also open forward. A rear restriction hole 36B, which serves as the restricted portion and is substantially rectangular-shaped, is formed piercing through the up-down direction intermediate portion of a rear end portion of the circuit board 36, and the rear restriction hole 36B extends in the front-rear direction and is also open rearward. A lower restriction hole 36C, which serves as the restricted portion and is substantially rectangular-shaped, is formed piercing through a front portion of a lower end portion of the circuit board 36, and the lower restriction hole 36C extends in the up-down direction and is also open downward.

The front restriction pillar 22A and the rear restriction pillar 22B of the main plate 12A are respectively inserted into the front restriction hole 36A and the rear restriction hole 36B and fitted together therewith in the up-down directions, which restricts movement of the front restriction hole 36A and the rear restriction hole 36B in the up-down direction with respect to the front restriction pillar 22A and the rear restriction pillar 22B respectively, such that movement of the circuit board 36 in the up-down direction is restricted. The lower restriction pillar 22C of the main plate 12A is inserted into the lower restriction hole 36C and fitted together therewith in the front-rear direction, which restricts movement of the lower restriction hole 36C in the front-rear direction with respect to the lower restriction pillar 22C, such that movement of the circuit board 36 in the front-rear direction is restricted.

A restriction screw 38 serving as a restriction member pierces from the right through a portion at the front side and the lower side of the circuit board 36, and the restriction screw 38 is screwed into the front wall of the main plate 12A, fastening the circuit board 36 to the main plate 12A. The circuit board 36 is abutted by a head of the restriction screw 38, and is also abutted by the front wall, the rear wall, and the lower wall of the main plate 12A, with left-right direction movement of the circuit board 36 restricted thereby.

A magnetic sensor (omitted in the drawings) serving as a detection portion is provided at a portion at the front side and the upper side of the circuit board 36, and the magnetic sensor faces the magnet 34C of the magnet body 34 in the left-right direction and detects the direction of the magnetic field generated by the magnet 34C. This means that the magnetic sensor detects a rotation position of the magnet 34C and detects a rotation position of the magnet body 34, and thereby a swing position of the lever 26 is detected and a shift position of the lever 26 is detected.

Next, an operation of the present embodiment will be described.

When assembling the shift device 10 configured as described above, the restraint block 24 is assembled from the right to the upper portion inside the left wall of the main plate 12A of the plate 12. The support shaft 16 of the main plate 12A is then passed through the lower end portion of the lever 26 (including the restraint pin 30 and the spring) approaching from the right, and the leading end face of the restraint pin 30 is abutted against the restraint face 24A of the restraint block 24 by biasing force of the spring.

After this, the assembly shaft 18 of the main plate 12A is inserted into the magnet body 34 (including the magnet 34C) approaching from the right, the rotation gear 34B of the magnet body 34 is meshed with the gear teeth 32A of the lever 26 (the gear plate 32), and also the left face of the leading end portion of the assembly claw 20 is abutted against the right face of the latch plate 34A of the magnet body 34. The front restriction pillar 22A, the rear restriction pillar 22B, and the lower restriction pillar 22C of the main plate 12A are respectively inserted into the front restriction hole 36A, the rear restriction hole 36B, and the lower restriction hole 36C of the circuit board 36 (including the magnetic sensor) approaching from the right, and the circuit board 36 is fastened to the main plate 12A from the right by the restriction screws 38.

The sub plate 12B is finally fastened by the assembly screws 14 to the main plate 12A from the right.

The lever 26, the magnet body 34, and the circuit board 36 are assembled to the same single main plate 12A. This means that a high relative positioning accuracy can be achieved between the lever 26, the magnet body 34 (the magnet 34C), and the circuit board 36 (the magnetic sensor), a high detection accuracy of a swing position of the lever 26 can be achieved, and a high detection accuracy of a shift position of the lever 26 can be achieved.

Moreover, the lever 26 and the magnet body 34 (the magnet 34C) are configured by separate bodies. This means that an amount of swing of the lever 26 and an amount of rotation of the magnet body 34 (the magnet 34C) can be adjusted. In particular, in the present embodiment, the amount of rotation of the magnet body 34 (the magnet 34C) is amplified with respect to the amount of swing of the lever 26. This means that a high detection accuracy of swing position of the lever 26 can be achieved by the magnetic sensor detecting the rotation position of the magnet 34C, a high detection accuracy of shift position of the lever 26 can be achieved, and a swing range of the lever 26 (amount of swing between shift positions) can be made small. Moreover, due to the radial dimension of the magnet body 34 being small, a radial dimension of the magnet 34C can be small, which reduces costs, and the plate 12 can be made smaller.

Furthermore, the restraint block 24 (including the restraint face 24A) and the lever 26 (including the restraint pin 30 and the spring) are assembled to the same single main plate 12A. This means that a high relative positioning accuracy can be achieved between the lever 26 (including the restraint pin 30 and the spring) and the restraint block 24 (including the restraint face 24A), a high accuracy can be achieved in a biased position of the lever 26 (H position) by an interaction between the restraint face 24A, the restraint pin 30, and the spring, and a high accuracy can be achieved in a hold position of the lever 26 (H position).

Moreover, the restraint block 24, the lever 26, the magnet body 34, and the circuit board 36 are all assembled from the right (from the same direction) to the main plate 12A. This means that the restraint block 24, the lever 26, the magnet body 34, and the circuit board 36 can be assembled to the main plate 12A easily. Moreover, the sub plate 12B is assembled from the right to the main plate 12A. This thereby enables the shift device 10 to be assembled easily.

Second Embodiment

Figure 3:
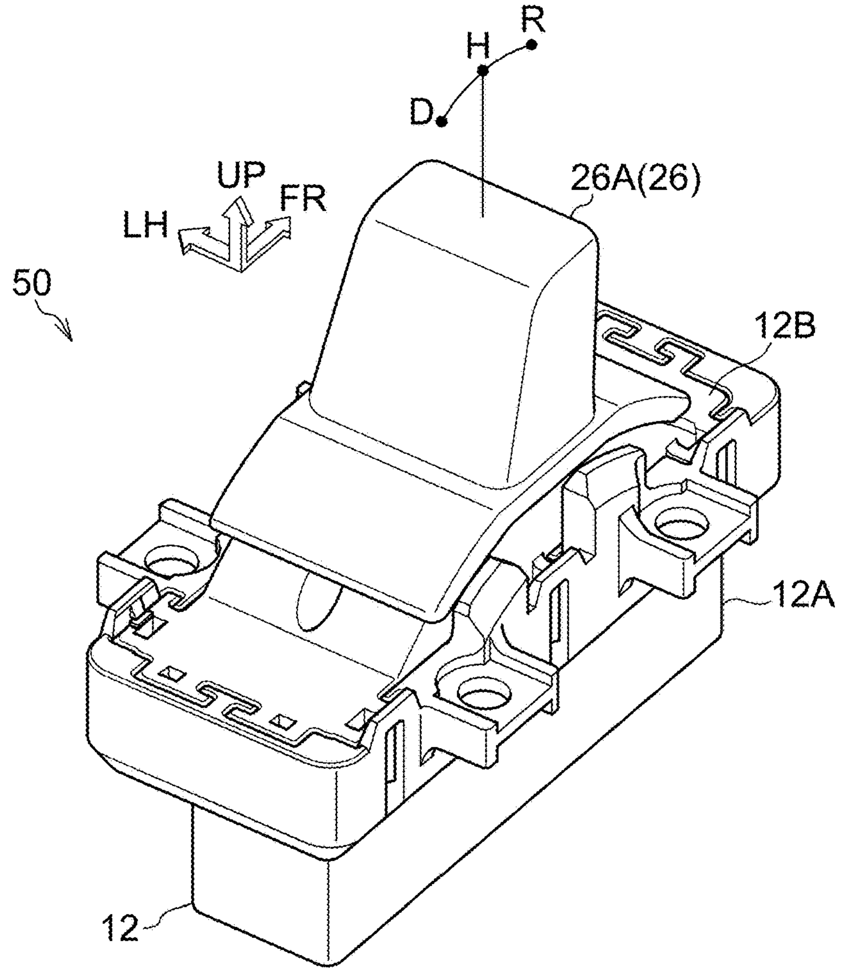
FIG. 3 is a perspective view illustrating a shift device according to a second embodiment of the present disclosure, as viewed obliquely from the right and the rear.

FIG. 3 is a perspective view illustrating a shift device 50 according to a second embodiment of the present disclosure, as viewed obliquely from the right rear.

The shift device 50 according to the present embodiment has substantially the same configuration as that of the first embodiment described above, however it differs in the following points.

As illustrated in FIG. 3, in the shift device 50 according to the present embodiment, a main plate 12A, which is substantially rectangular parallelepiped box-shaped, is provided at a lower side portion of the plate 12, and an inside of the main plate 12A is open upward. A sub plate 12B, which is substantially rectangular parallelepiped box-shaped, is provided at an upper side portion of the plate 12, and an inside of the sub plate 12B is open downward. The plate 12 is configured by the main plate 12A and the sub plate 12B being assembled together in the up-down direction.

Figure 4A:
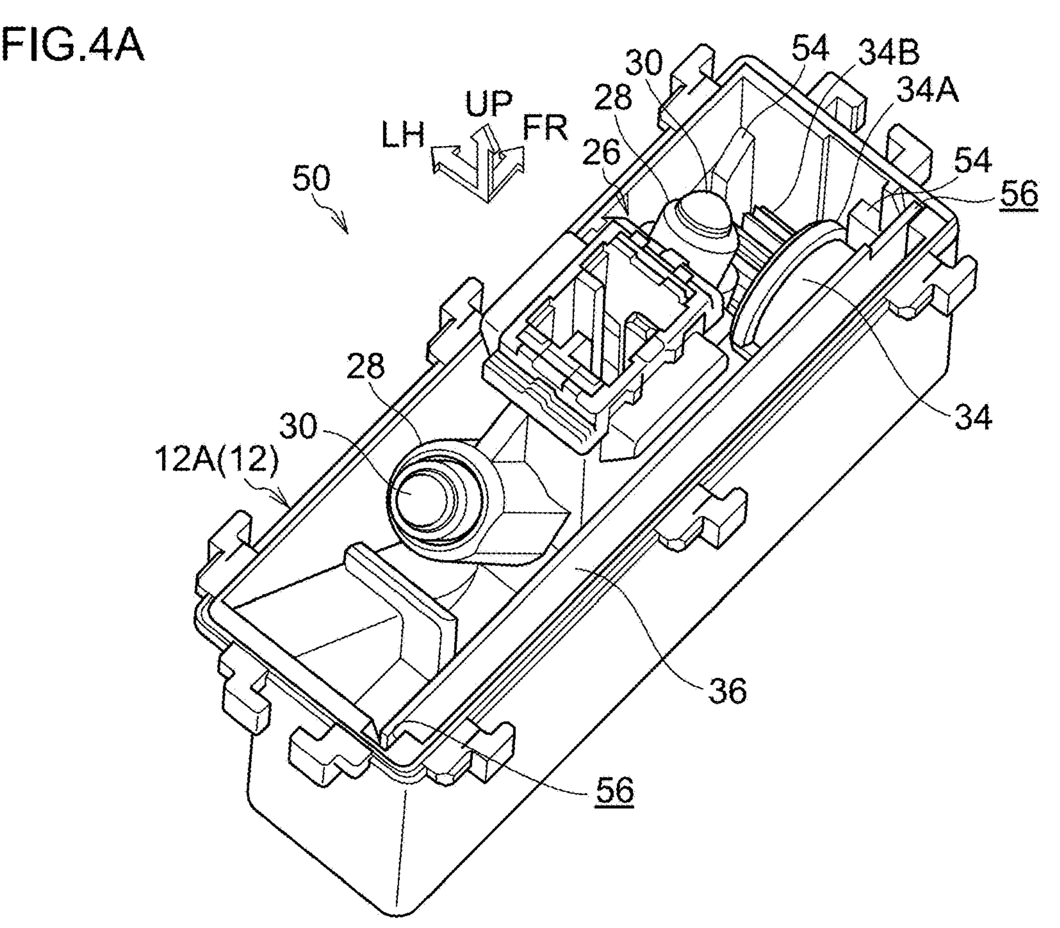
FIG. 4A is a perspective view illustrating an interior of the shift device according to the second embodiment of the present disclosure, as viewed obliquely from the right and the rear.
Figure 4B:
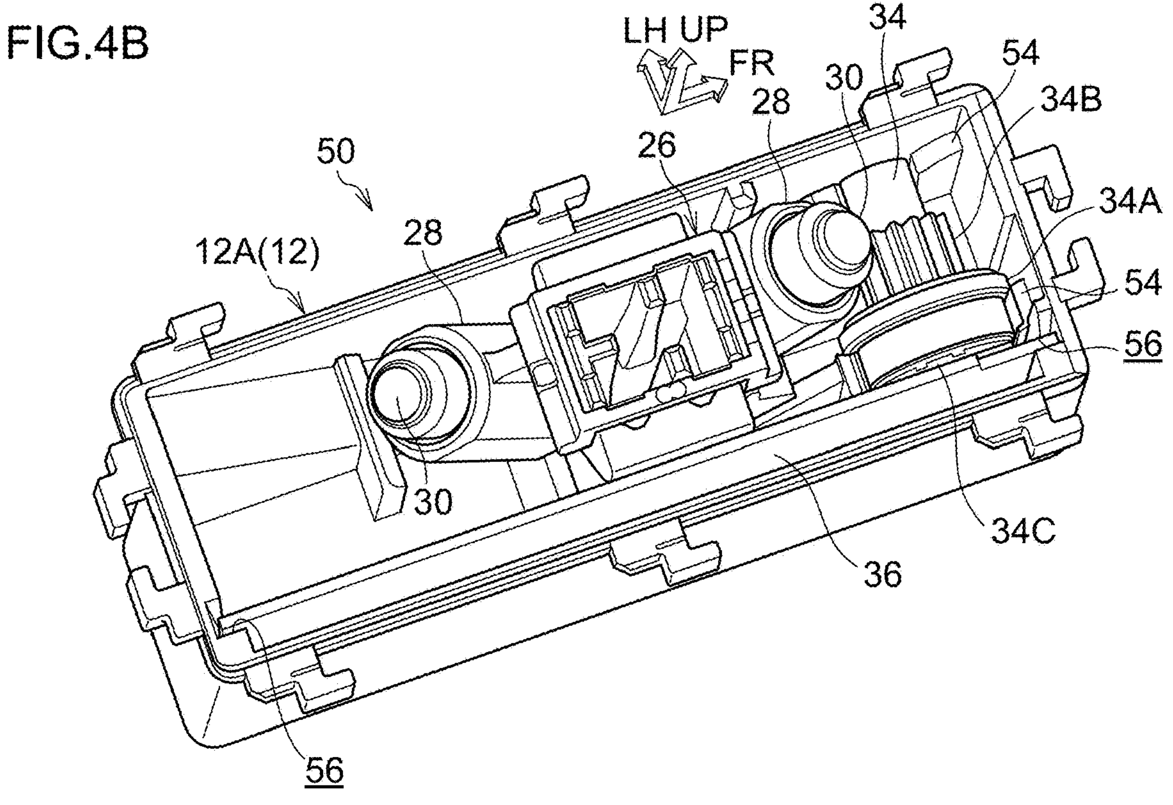
FIG. 4B is a perspective view illustrating the interior of the shift device according to the second embodiment of the present disclosure, as viewed from the right side.
Figure 5A:
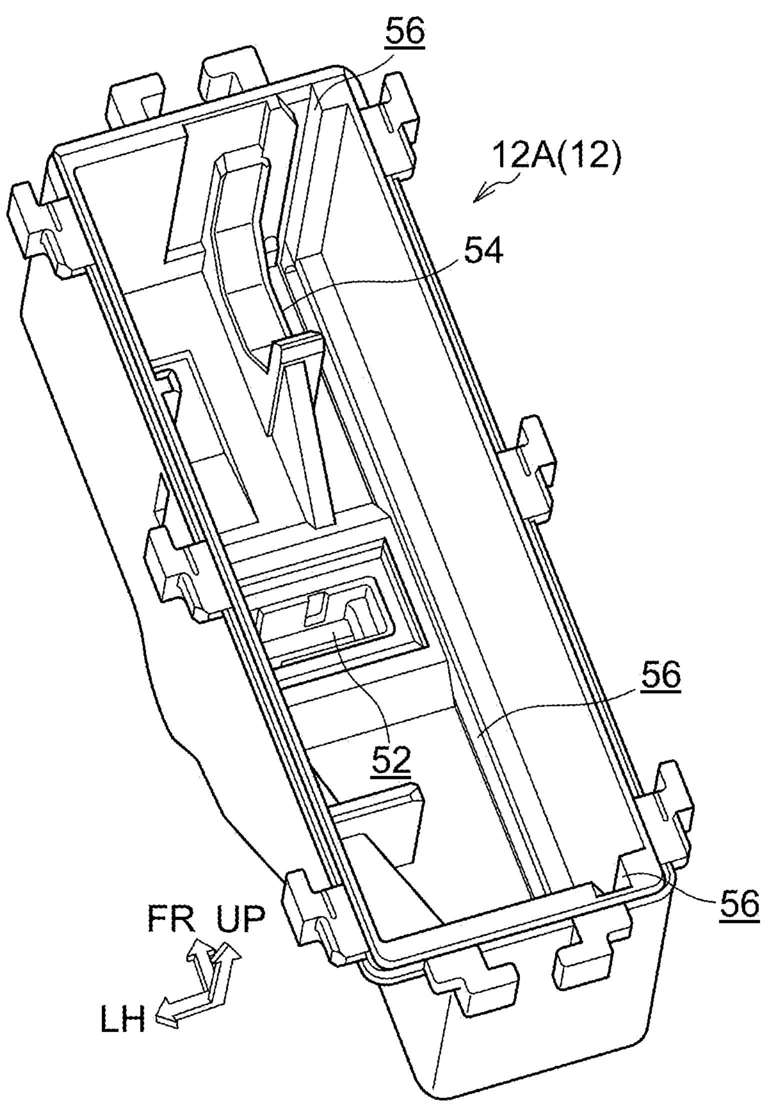
FIG. 5A is a perspective view illustrating a main plate of the shift device according to the second embodiment of the present disclosure, as viewed from the rear side.
Figure 5B:
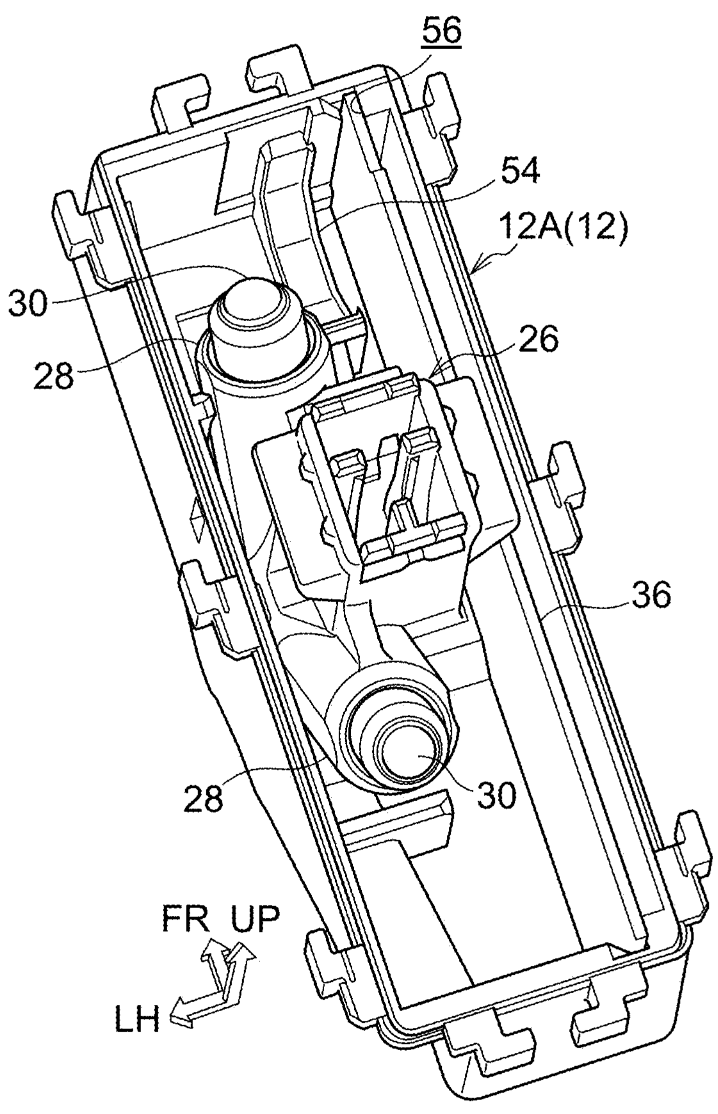
FIG. 5B is a perspective view illustrating an inside of the main plate of the shift device according to the second embodiment of the present disclosure, as viewed from the rear side.

A support hole 52, which serves as a support portion and is substantially rectangular pillar-shaped, is formed to a front-rear direction intermediate portion on the lower face of the inside of the main plate 12A (see FIG. 5A and FIG. 5B), and the support hole 52 is open upward. A pair of assembly plates 54 (see FIG. 4A and FIG. 4B), which serves as an assembly portion and is substantially U-plate-shaped, are integrally provided at a front portion of a lower face of the inside of the main plate 12A, and the assembly plates 54 protrude upward and also are placed perpendicular to the left-right direction. The pair of assembly plates 54 are separated from each other in the left-right direction and face each other, and the left side assembly plate 54 is integrated with the front and left walls of the main plate 12A, and the right side assembly plate 54 is integrated with the front wall of the main plate 12A. The insides of the assembly plates 54 are open upward, and lower faces of the inside of the assembly plates 54 are concave in a substantially downwardly indented circular arc shaped in cross-section.

A restriction groove 56, which serves as a restricting portion and is a rectangular-shaped in cross-section, is formed at a right end portion of the front face, rear face, and lower face of the inside of the main plate 12A, and the restriction groove 56 is located further to the right side than the support hole 52 and the pair of assembly plates 54. A front portion and a rear portion of the restriction groove 56 extend in the up-down direction opening upward, and a lower portion of the restriction groove 56 extends in the front-rear direction and in communication with the front portion and the rear portion of the restriction groove 56.

A lower end portion of the lever 26 (see FIG. 4A, FIG. 4B, FIG. 6) is configured in a substantially circular pillar shape, and a lower end portion of the lever 26 is inserted into the support hole 52 of the main plate 12A and fits together therewith in the front-rear direction and the left-right direction. This means that the lever 26 is able to swing in the front-rear direction centered on the lower end portion thereof, and the lever 26 passes through an upper wall of the sub plate 12B so that it can swing.

Each of restraint cylinders 28 is integrally provided at both a front side and rear side of a lower portion of the lever 26, the front side restraint cylinder 28 is located with its axial direction parallel to obliquely forward and upward and with the interior thereof opening obliquely forward and upward, and the rear side restraint cylinder 28 is located with its axial direction parallel to obliquely rearward and upward and with the interior thereof opening obliquely rearward and upward. A restraint pin 30 and a spring are inserted into the respective restraint cylinders 28, and the front side restraint pin 30 is biased obliquely forward and upward by the front side spring, and the rear side restraint pin 30 is biased obliquely rearward and upward by the rear side spring.

Each of restraint blocks 24 is fixed to each of a front portion and a rear portion of the inside of the sub plate 12B, and the front side restraint pin 30 faces toward a restraint face 24A of the front side restraint block 24, and a rear side restraint pin 30 faces toward the restraint face 24A of the rear side restraint block 24. A leading end face of the front side restraint pin 30 is abutted against the front-rear direction center of the front side restraint face 24A by biasing force of the front side spring, and a leading end face of the rear side restraint pin 30 is abutted against the front-rear direction center of the rear side restraint face 24A by biasing force of the rear side spring, which enables the lever 26 to be biased toward the H position side and held in the H position.

A gear plate 32 is integrally provided at the front side of the front side restraint cylinder 28 of the lever 26, and the gear plate 32 protrudes toward the front side and has gear teeth 32A on an upper side portion thereof.

A left end portion and a right end portion of a magnet body 34 (see FIG. 4A, FIG. 4B, FIG. 6) are respectively inserted inside the left side and right side assembly plates 54 of the main plate 12A, and a left end portion and a right end portion of the magnet body 34 are respectively abutted against the lower faces of the left side and right side assembly plates 54, and the left end portion and the right end portion of the magnet body 34 respectively fit together therewith in the front-rear direction at the insides of the left side and right side assembly plates 54. Latch protruding portions (omitted in the drawings) of the sub plate 12B are respectively abutted against the left end portion and the right end portion of the magnet body 34, which enables upward movement of the magnet body 34 to be latched. The latch plate 34A of the magnet body 34 is abutted against the right side assembly plate 54 with movement toward the right latched thereby, and the left end face of the magnet body 34 is abutted against the left wall of the main plate 12A with movement toward the left latched thereby, which enables left-right direction movement of the magnet body 34 to be latched.

A front end portion, rear end portion, and lower end portion of a circuit board 36 (see FIG. 4A, FIG. 4B, FIG. 6) are respectively inserted into a front portion, rear portion, and lower portion of the restriction groove 56 of the main plate 12A, and the circuit board 36 is fitted together with the restriction groove 56 in the left-right direction. The lower end face of the circuit board 36 is abutted against the lower face of the restriction groove 56, and the front end face and the rear end face of the circuit board 36 are respectively abutted against the front face and the rear face of the restriction groove 56. The sub plate 12B is abutted against the upper end face of the circuit board 36, which enables upward movement of the circuit board 36 to be latched.

When the shift device 50 configured as described above is being assembled, the lower end portion of the lever 26 (including the restraint pin 30 and the spring) is inserted from above into the support hole 52 of the main plate 12A of the plate 12. Moreover, the left end portion and the right end portion of the magnet body 34 (including magnets 34C) are respectively inserted from above to the inside of the left side and right side assembly plates 54 of the main plate 12A, which causes the right face of the latch plate 34A of the magnet body 34 to abut against the left face of the right side assembly plate 54, the left end face of the magnet body 34 to abut against the left wall of the main plate 12A, and rotation gears 34B of the magnet body 34 to mesh with the gear teeth 32A of the lever 26 (gear plate 32). Furthermore, the circuit board 36 (including magnetic sensors) is inserted from above into the restriction groove 56 of the main plate 12A.

Finally, the sub plate 12B is assembled from above to the main plate 12A. This means that the leading end faces of the restraint pins 30 are abutted against the restraint faces 24A of the restraint blocks 24 of the sub plate 12B by biasing force of the springs, the latch protruding portions of the sub plate 12B are also abutted against the left end portion and the right end portion of the magnet body 34, and the sub plate 12B is also abutted against the upper end face of the circuit board 36.

In the present embodiment too, similar operation and advantageous effects can be exhibited to those of the first embodiment as described above, except in the operation and advantageous effects arising from the restraint block 24 being assembled to the main plate 12A.

In particular, the lever 26, the magnet body 34, and the circuit board 36 are assembled to the main plate 12A from above (the same direction). This thereby enables the lever 26, the magnet body 34, and the circuit board 36 to be assembled to the main plate 12A easily. Moreover, the sub plate 12B is assembled to the main plate 12A from above. This thereby enables the shift device 50 to be assembled easily.

Note that the lever 26 and the magnet 34C are separate bodies in the first embodiment and the second embodiment described above. However, the magnet 34C (moving portion) may be integrated with the lever 26.

Moreover, the lever 26 is swung in the first embodiment and the second embodiment described above. However, the lever 26 may be slid or may be rotated (moved) about a central axis.

Furthermore, the shift devices 10, 50 are installed to a console of a vehicle in the first embodiment and the second embodiment described above. However, the shift devices 10, 50 may be installed to another portion of a vehicle (on the vehicle body side, such as to an instrument panel or a steering column).

The entire content of the disclosure of Japanese Patent Application No. 2022-094684 filed on Jun. 10, 2022 is incorporated by reference in the present specification.

All publications, patent applications and technical standards mentioned in the present specification are incorporated by reference in the present specification to the same extent as if each individual publication, patent application, or technical standard was specifically and individually indicated to be incorporated by reference.

The invention claimed is:

1. A shift device, comprising:

an assembly body configured to be installed to a vehicle as a single unit, the assembly body being a one-piece member and including:

a support shaft protruding from the assembly body, an assembly shaft protruding from the assembly body in the same direction as the support shaft, and restriction pillars protruding from the assembly body in the same direction as the support shaft, the support shaft, the assembly shaft, and the restriction pillars being integrally formed with the assembly body;

a shift body fitted onto the support shaft so as to be movable with respect to the assembly body;

a moving portion fitted onto the assembly shaft and configured to move when the shift body is moved; and a detection mechanism fitted onto the restriction pillars and configured to detect a shift position of the shift body by detecting a relative position between the detection mechanism and the moving portion.

2. The shift device of claim 1, wherein the shift body and the moving portion are separate bodies.

3. The shift device of claim 1, further comprising a restraint block assembled to the assembly body, the restraint block guiding the shift body to a home position.

4. The shift device of claim 1, wherein the shift body, the moving portion, and the detection mechanism are mounted directly on the assembly body.

5. The shift device of claim 1, wherein the support shaft, the assembly shaft, and the restriction pillars are arranged in parallel.

* * * * *